(12) United States Patent
Kim

(10) Patent No.: US 12,257,995 B2
(45) Date of Patent: Mar. 25, 2025

(54) METHOD AND APPARATUS FOR BRAKING VEHICLE

(71) Applicants: Hyundai Motor Company, Seoul (KR); Kia Corporation, Seoul (KR)

(72) Inventor: Jin Yong Kim, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 357 days.

(21) Appl. No.: 17/849,331

(22) Filed: Jun. 24, 2022

(65) Prior Publication Data

US 2023/0382359 A1 Nov. 30, 2023

(30) Foreign Application Priority Data

May 30, 2022 (KR) .................... 10-2022-0066289

(51) Int. Cl.
*B60T 8/1761* (2006.01)
*B60T 8/1766* (2006.01)

(52) U.S. Cl.
CPC .......... *B60T 8/1761* (2013.01); *B60T 8/1766* (2013.01); *B60T 2250/02* (2013.01); *B60T 2270/602* (2013.01)

(58) Field of Classification Search
CPC .. B60T 8/1761; B60T 8/1766; B60T 2250/02; B60T 2270/602
See application file for complete search history.

(56) References Cited

U.S. PATENT DOCUMENTS

2005/0143878 A1* 6/2005 Park ................. B60W 20/11
180/65.25
2019/0217709 A1* 7/2019 Zhao ................. B60T 8/172

* cited by examiner

*Primary Examiner* — Yuen Wong
(74) *Attorney, Agent, or Firm* — Morgan, Lewis & Bockius LLP

(57) ABSTRACT

A method for braking a vehicle includes braking a driving wheel of the vehicle by performing regenerative braking or auxiliary braking; comparing required braking force with braking force of the driving wheel; and additionally braking a non-driving wheel of the vehicle, when the controller concludes that the braking force of the driving wheel is lower than the required braking force.

17 Claims, 4 Drawing Sheets

METHOD AND APPARATUS FOR BRAKING VEHICLE

CROSS-REFERENCE TO RELATED APPLICATION(S)

The present application claims priority to Korean Patent Application No. 10-2022-0066289 filed on May 30, 2022 the entire contents of which is incorporated herein for all purposes by this reference.

BACKGROUND OF THE PRESENT DISCLOSURE

Field of the Present Disclosure

The present disclosure relates to a method and apparatus of braking a vehicle, and more particularly, to a method and apparatus of braking a vehicle, used in performing regenerative braking or auxiliary braking.

Description of Related Art

Regenerative braking may be used in hybrid vehicles, electric vehicles, or the like. In regenerative braking, when a vehicle stops or decelerates, a driving electric motor may serve to act as a generator, converting kinetic energy generated in stopping or decelerating into electrical energy, and charge the vehicle's battery with the electrical energy, to achieve energy recovery.

Auxiliary braking may serve to reduce a load on a main braking system and maintain braking performance constantly. For example, an exhaust brake, a Jake brake, a retarder brake, or the like, may be used as a device for auxiliary braking. A retarder brake, a device for auxiliary braking, may further include a technology to improve efficiency by recovering energy generated during deceleration, and thus, with the recent growth of the electric vehicle market, is attracting attention.

When regenerative braking or auxiliary braking is undertaken according to the related art, excessive wheel slip may occur in a driving environment in which a friction coefficient between a tire and a road surface is low such as on a low-friction road or the like. Although it is possible to control so that the excessive wheel slip does not occur by use of PID control or the like, there may be a problem in that required braking force of a vehicle is not satisfied due to control for reducing wheel slip.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus of braking a vehicle, improving braking force in regenerative braking or auxiliary braking.

According to an aspect of the present disclosure, a method for braking a vehicle includes braking a driving wheel of the vehicle by performing regenerative braking or auxiliary braking; comparing required braking force with braking force of the driving wheel; and additionally braking a non-driving wheel of the vehicle, when the controller concludes that the braking force of the driving wheel is lower than the required braking force.

In the braking a driving wheel, when the controller concludes that wheel slip exceeding a predetermined slip value occurs in the driving wheel, the braking force of the driving wheel may be reduced to be equal to or lower than the predetermined slip value.

In the braking a non-driving wheel of the vehicle, a braking force reduction value of the driving wheel and a reference value may be compared, to perform a first control of braking the non-driving wheel in proportion to the braking force reduction value of the driving wheel, or to perform a second control of braking the non-driving wheel, depending on the braking force of the driving wheel.

The first control of braking the non-driving wheel may be performed with a first braking force determined from a difference value between the required braking force and the braking force of the driving wheel, when the controller concludes that the braking force reduction value of the driving wheel is lower than the reference value, and the second control of braking the non-driving wheel may be performed with a second braking force in proportion to the braking force of the driving wheels in a predetermined ratio, when the controller concludes that the braking force reduction value of the driving wheel is equal to or greater than the reference value.

The braking force reduction value of the driving wheel may be a value determined from a ratio of a difference between the required braking force and the braking force of the driving wheel to the required braking force.

The reference value may be determined from a ratio of a total shaft weight of the non-driving wheel to a total shaft weight of the vehicle.

The predetermined ratio may be a value determined from a ratio of a shaft weight of the non-driving wheel to a shaft weight of the driving wheel.

In the braking a non-driving wheel of the vehicle, the non-driving wheel may be braked in response to a plurality of non-driving wheel shafts, wherein braking force for each of plurality of non-driving wheel shafts may be distributed according to a ratio of a shaft weight of a corresponding non-driving wheel to a total shaft weight of the non-driving wheel.

In the braking a driving wheel, regenerative braking or auxiliary braking may be performed using feedback control.

According to an aspect of the present disclosure, an apparatus of braking a vehicle includes a brake configured for braking a non-driving wheel of the vehicle; a brake controller configured for controlling braking force of the brake; and a braking condition determination unit configured to determine braking force of a driving wheel of the vehicle for reducing wheel slip, when wheel slip exceeding a predetermined slip value occurs in the driving wheel in performing regenerative braking or auxiliary braking, and to compare a required braking force with the braking force of the driving wheel, to determine whether to brake the non-driving wheel, wherein, when the braking force of the driving wheel is lower than the required braking force, the braking condition determination unit is configured to determine that braking of the non-driving wheel is necessary, and the brake controller is configured to brake the non-driving wheel according to a determination result of the braking condition determination unit.

The brake controller may reduce the braking force of the driving wheel, when wheel slip exceeding a predetermined slip value occurs in the driving wheel.

The brake controller may compare a braking force reduction value of the driving wheel and a reference value, to perform a first control of braking the non-driving wheel in proportion to the braking force reduction value of the driving wheel, or to perform a second control of braking the non-driving wheel, depending on the braking force of the driving wheel.

The brake controller may perform the first control of braking the non-driving wheel with a first braking force determined from a difference value between the required braking force and the braking force of the driving wheel, when the braking condition determination unit concludes that the braking force reduction value of the driving wheel is lower than the reference value, and the second control of braking the non-driving wheel with a second braking force in proportion to the braking force of the driving wheels in a predetermined ratio, when the braking condition determination unit concludes that the braking force reduction value of the driving wheel is equal to or greater than the reference value.

The braking force reduction value of the driving wheel may be a value determined from a ratio of a difference between the required braking force and the braking force of the driving wheel to the required braking force.

The reference value may be determined from a ratio of a total shaft weight of the non-driving wheel to a total shaft weight of the vehicle.

The predetermined ratio may be a value determined from a ratio of a shaft weight of the non-driving wheel to a shaft weight of the driving wheel.

The brake controller may brake the non-driving wheel in response to a plurality of non-driving wheel shafts, wherein the brake controller is configured to distribute braking force for each of plurality of non-driving wheel shafts according to a ratio of a shaft weight of a corresponding non-driving wheel to a total shaft weight of the non-driving wheel.

The brake controller may perform regenerative braking or auxiliary braking using feedback control.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
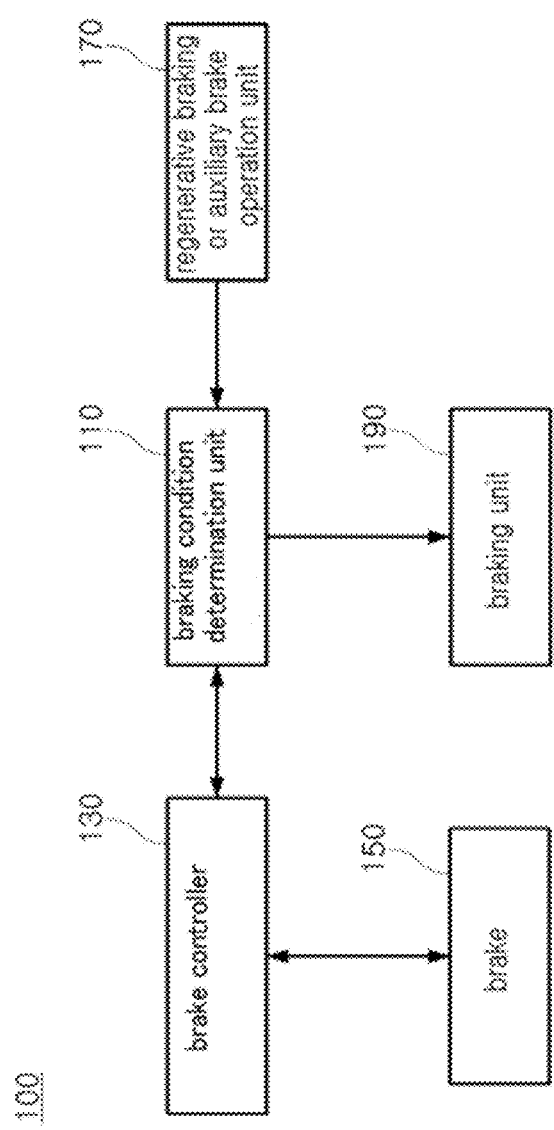
FIG. 1 is a block diagram illustrating an apparatus of braking a vehicle, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Since the present disclosure may have various changes and may have various exemplary embodiments of the present disclosure, specific embodiments may be illustrated in the drawings and described in detail. However, this is not intended to limit the present disclosure to specific embodiments, it should be understood to include all modifications, equivalents, and substitutes included in the spirit and scope of the present disclosure.

Terms such as first, second, and the like may be used to describe various elements, but the elements should not be limited by the terms. The above terms may be used only for distinguishing one component from another. For example, without departing from the scope of the present disclosure, a first component may be referred to as a second component, and similarly, a second component may also be referred to as a first component. The term "and/or" may include a combination of a plurality of related listed items or any of the plurality of related listed items.

The terms used in the present application may be only used to describe specific embodiments, and are not intended to limit the present disclosure. The singular expression may include the plural expression, unless the context clearly dictates otherwise. In the present application, it should be understood that terms such as "include," "comprise," or "have" are intended to designate that features, numerals, steps, operations, components, parts, or combination thereof described in the specification exists, but one or more other features this does not preclude the existence or addition of numbers, steps, operations, components, parts, or combinations thereof.

Unless defined otherwise, all terms used herein, including technical or scientific terms, have the same meaning as that which can commonly understood by one of ordinary skill in the art to which the present disclosure belongs. Terms such as those defined in a commonly used dictionary should be interpreted as having a meaning consistent with the meaning in the context of the related art, and should not be interpreted in an ideal or excessively formal manner unless explicitly defined in the present application.

Hereinafter, exemplary embodiments of the present disclosure will be described in more detail with reference to the accompanying drawings.

FIG. 1 is a block diagram illustrating an apparatus 100 for braking a vehicle, according to an exemplary embodiment of the present disclosure.

An apparatus 100 for braking a vehicle according to an exemplary embodiment of the present disclosure may include a brake controller 130, a braking condition determination unit 110, a brake 150, a regenerative braking or auxiliary braking operation unit 170, and a braking unit 190.

The brake controller 130 may control the brake 150 to adjust a magnitude of braking force of a non-driving wheel. Also, the brake controller 130 may obtain state information such as information on wheel speed and shaft weight of a vehicle, and may transmit the same to the braking condition determination unit 110. The brake controller 130 may include an electronic brake system (EBS) controller.

The brake 150 may generate braking force under control of the brake controller 130. The braking force of the non-driving wheel derived from the braking condition determination unit 110 may be transmitted to the brake controller 130, and the brake controller 130 may brake the non-driving wheel through the brake 150. The brake 150 may brake a driving wheel, or may brake the driving wheel and the non-driving wheel at the same time, in a normal braking situation. When required braking force is not satisfied by braking the driving wheel during a process performing regenerative braking or auxiliary braking, the brake 150 may brake the non-driving wheel. During regenerative braking or auxiliary braking, the braking of the non-driving wheel by the brake 150 may be performed under control of the brake controller 130. In the instant case, the required braking force means braking force required to brake a vehicle at a degree of target deceleration required by the vehicle. As an example of the brake 150, a compressed air brake, a hydraulic brake, a pneumatic-hydraulic brake, a mechanical brake, an electric brake, or the like may be used.

The regenerative braking or auxiliary braking operation unit 170 may output required braking force requested by a driver, and may transmit the same to the braking condition determination unit 110, during the regenerative braking or auxiliary braking. As an exemplary embodiment of the present disclosure, the regenerative braking or auxiliary brake operation unit 170 may include a brake lever for regenerative braking or auxiliary braking, a brake pedal, and the like. Furthermore, the regenerative braking or auxiliary braking operation unit 170 may transmit the required braking force to the braking condition determination unit 110 according to user operation. The regenerative braking or auxiliary braking operation unit 170 may transmit the required braking force to the braking condition determination unit 110, when a driving state satisfies a preset condition.

The braking unit 190 may output braking force required for regenerative braking or auxiliary braking under control of the braking condition determination unit 110 during the regenerative braking or auxiliary braking. The braking unit 190 may include a motor in the regenerative braking, and may include a retarder in the auxiliary braking.

The braking condition determination unit 110 may determine a wheel speed of a rear (RR) wheel relative to a front (FRT) wheel, based on wheel speed data received from the brake controller 130. The braking condition determination unit 110 may continuously check whether wheel slip of the vehicle has occurred, based on the wheel speed. When excessive wheel slip occurs in the vehicle, the braking condition determination unit 110 may control the wheel slip by feedback control. In the instant case, as the feedback control, any one of proportional (P) control, proportional integral (PI) control, proportional derivative (PD) control, or proportional integral derivative (PID) control may be used alone or alternately. The braking condition determination unit 110 may determine appropriate braking force for slip control when the feedback control is entered.

When the feedback control is used, the appropriate braking force for the slip control may not reach required braking force due to limitation of a friction coefficient between a tire and a road surface. In the instant case, there may be a problem in that the vehicle is inevitably decelerated at a deceleration, lower than target deceleration, and a method for adding braking force reduced due to control of the driving wheel may be required.

In controlling braking force of the vehicle, it may be necessary to brake with braking force capable of decelerating the vehicle to target deceleration and ensuring stability of the vehicle. When the vehicle brakes, occurrence of the wheel slip may be inevitable. Until a predetermined wheel slip rate is reached after the occurrence of wheel slip, braking performance of the vehicle may increase, as a slip rate increases. When the wheel slip rate exceeds a predetermined magnitude, the braking performance may be rather reduced, as the wheel slip rate increases. For example, when wheel slip exceeding the predetermined magnitude occurs, vibration of the vehicle may occur due to intervention of an anti-lock braking system (ABS) or the like. Therefore, the vehicle may set a wheel slip value that enables stable driving, and when wheel slip exceeding the predetermined slip value occurs, the vehicle may brake to generate wheel slip, equal to or lower than the predetermined slip value, to maintain stability of the vehicle and realize optimum braking performance of the vehicle.

Similarly, even when regenerative braking or auxiliary braking is performed using the feedback control, it is possible to control the slip rate on a level on which stability of the vehicle is maintained. For example, when a slip value (e.g., 10%) is set and wheel slip exceeding the predetermined slip value occurs, it may be controlled to be equal to or lower than the predetermined slip value. In performing regenerative braking or auxiliary braking, when wheel slip exceeding the predetermined slip value occurs and braking force is controlled to be equal to or lower than the predetermined slip value, a magnitude of the braking force of the vehicle may be reduced. According to an exemplary embodiment of the present disclosure, when required braking force is satisfied with braking force of the driving wheel due to slip control of regenerative braking or auxiliary braking, it may be configured to brake the non-driving wheel together with the driving wheel, to secure optimal braking performance.

Also, the braking condition determination unit 110 may determine braking force which may be added through braking of the non-driving wheel, when braking force of the driving wheel does not satisfy the required braking force. In more detail, the braking condition determination unit 110 may determine braking force of the driving wheel to be equal to or lower than the predetermined slip value, and may compare a required braking force with braking force of the driving wheel, to determine whether to brake the non-driving wheel. When the braking force of the driving wheel is lower than the required braking force, the braking condition determination unit 110 may determine that braking is required for the non-driving wheel, and may determine braking force required for braking. The brake controller 130 may control the brake 150 to brake the non-driving wheel according to the determination result of the brake condition determination unit 110.

When the reduced braking force of the driving wheel is simply added as the braking force of the non-driving wheel, the braking force of the non-driving wheel may be excessive, to occur wheel slip exceeding the predetermined slip value. When wheel slip exceeding the predetermined slip value occurs in the non-driving wheel, entire stability of the vehicle may deteriorate, like the driving wheel, and when an anti-lock braking system (ABS) intervenes, vibration of the vehicle or the like may occur.

An exemplary embodiment of the present disclosure may a configuration for selecting a control method for a non-driving wheel capable of comparing a reference value and a braking force reduction value of the driving wheel, and according to a result thereof, generating braking force close to required braking force without causing wheel slip exceeding a predetermined slip value.

In the instant case, the braking force reduction value of the driving wheel may be determined from a ratio of a difference between required braking force and braking force of a driving wheel to the required braking force. The braking force reduction value of the driving wheel may be expressed as the following Equation 1.

$$\text{braking force reduction value of driving wheel} = \frac{\text{required braking force} - \text{braking force of driving wheel}}{\text{required braking force}} \times 100(\%) \quad \text{[Equation 1]}$$

The braking force reduction value of the driving wheel and a predetermined reference value may be compared to determine whether to select one of first control (additional control) or second control (follow-up control) as a control method for the non-driving wheel.

The braking condition determination unit 110 may select the control method for the non-driving wheel in a different manner, based on the reference value, to generate braking force, equal to or closest to the required braking force while preventing occurrence of wheel slip exceeding the predetermined slip value.

The braking condition determination unit 110 may select a first control method when the braking force reduction value of the driving wheel is lower than the reference value, and may select a second control method when the braking force reduction value of the driving wheel is equal to or greater than the reference value.

The first control method may be a method in which braking force of the non-driving wheel is used and added by a difference value between required braking force of the driving wheel and braking force of the driving wheel. For example, the first control method may be a method of controlling a sum of braking forces generated from the non-driving wheel and the driving wheel in the vehicle to have the same value as braking force required to brake the vehicle at a target deceleration. In the first control method, first braking force may be determined as illustrated in Equation 2, and braking of the non-driving wheel may be controlled based on the determined first braking force.

$$\text{first braking force} = \text{required braking force} - \text{braking force of driving wheel} \quad \text{[Equation 2]}$$

When a difference between required braking force and braking force of the driving wheel is large, and braking force of the non-driving wheel is generated by the first control (additional control) method, wheel slip exceeding the predetermined slip value may occur in the non-driving wheel. Therefore, when a difference between required braking force and braking force of the driving wheel is large, the braking condition determination unit 110 may control the non-driving wheel by the second control (follow-up control) method.

In the second control method, second driving force may be determined in proportion to a magnitude of braking force of the driving wheel so that wheel slip exceeding the predetermined slip value does not occur, and braking of the non-driving wheel may be controlled based on the determined second driving force. In the instant case, the second driving force may be determined from Equation 3.

$$\text{second driving force} = \text{braking force of driving wheel} \times \frac{\text{shaft weight of non-driving wheel}}{\text{shaft weight of driving wheel}} \quad \text{[Equation 3]}$$

The braking condition determination unit 110 may compare the reference value with the braking force reduction value of the driving wheel to select a braking method of the non-driving wheel, to control the non-driving wheel to generate braking force capable of braking at a deceleration close to a target deceleration without causing wheel slip exceeding the predetermined slip value.

Because friction force is determined as the product of friction coefficient and normal drag force, braking force may be changed depending on a weight of each shaft, and braking force causing wheel slip exceeding the predetermined slip value to affect stability of the vehicle may also be changed depending on a shaft weight. Therefore, a reference value for selecting a braking method of the non-driving wheel in which wheel slip exceeding the predetermined slip value does not occur may be determined according to a ratio of the shaft weight. The braking condition determination unit 110 may determine a reference value based on shaft weight information of the vehicle transmitted from the braking controller 130. Equation 4 may be used as a method of determining the reference value based on a shaft weight.

$$\text{reference value} = \frac{\text{shaft weight of non-driving wheel}}{\text{total shaft weight}} \times 100(\%) \quad \text{[Equation 4]}$$

In the instant case, the total shaft weight may be a sum of a shaft weight of the driving wheel and a shaft weight of the non-driving wheel. The braking condition determination unit 110 may select the first control method or the second control method using a reference value determined based on a total shaft weight and a shaft weight of the non-driving wheel, to control braking of the non-driving wheel under a condition in which wheel slip exceeding the predetermined slip value does not occur, even for a vehicle in which a shaft weight of a non-driving wheel is different from a shaft weight of a driving wheel.

Additionally, a vehicle may have a plurality of non-driving wheel shafts. For example, a vehicle may have one driving wheel shaft and two or more non-driving wheel shafts. When a plurality of non-driving wheel shafts are provided, braking force for all non-driving wheel shafts may be determined by assuming that the plurality of non-driving wheel shafts are provided as a single non-driving wheel shaft. As described above, when it is assumed that all of the non-driving wheels are provided as a single non-driving wheel shaft, a method for controlling braking force for all of the non-driving wheels and a method for determining the braking force may be the same as when a single non-driving wheel shaft is provided. It may be necessary to distribute braking force of a non-driving wheel determined by assuming that the plurality of non-driving wheel shafts are provided as a single non-driving wheel shaft, respectively, to non-driving wheel shafts. When shaft weights of non-driving wheels are different from each other for each shaft, because braking force causing wheel slip exceeding the predetermined slip value may be also different, braking force for each of the non-driving wheel shafts may distribute braking force for all of the non-driving wheel shafts, based on a shaft weight ratio of the non-driving wheel shafts.

For example, when a vehicle including a plurality of non-driving wheel shafts performs first control, first braking force may be distributed to each of the non-driving wheel shafts, based on a shaft weight ratio of each of the non-driving wheel shafts. Furthermore, when the vehicle performs second control, second braking force may be distributed to each of the non-driving wheel shafts, based on a shaft weight ratio of each of the non-driving wheel shafts. The distributed braking force distributed to the plurality of non-driving wheel shafts may be distributed according to a ratio of a weight of each of the non-driving wheel shafts. The distributed braking force distributed to each of the shafts may be expressed as Equation 5.

$$\text{distributed braking force of } k^{th} \text{ shaft} = \\ (\text{first or second braking force}) \times \\ \frac{\text{shaft weight of } k^{th} \text{ non-driving wheel shaft}}{\text{sum of shaft weights of non-driving wheel shafts}}$$

[Equation 5]

The braking condition determination unit 110 may transmit a determined braking force value of the non-driving wheel to the brake controller 130. The brake controller 130 may control braking of the non-driving wheel using the brake 150, based on the received braking force value of the non-driving wheel from the braking condition determination unit 110.

The braking condition determination unit 110, the brake controller 130, the brake 150, the regenerative braking or auxiliary braking operation unit 170, and the braking unit 190 may communicate with each other through a vehicle communication network. For example, the systems may transmit or receive information through an Ethernet, a media oriented systems transport (MOST), a FlexRay, a controller area network (CAN), a local interconnect network (LIN), or the like.

In an exemplary embodiment of the present invention, the braking condition determination unit 110 and the brake controller 130 may be integrated to be a single controller.

Figure 2:
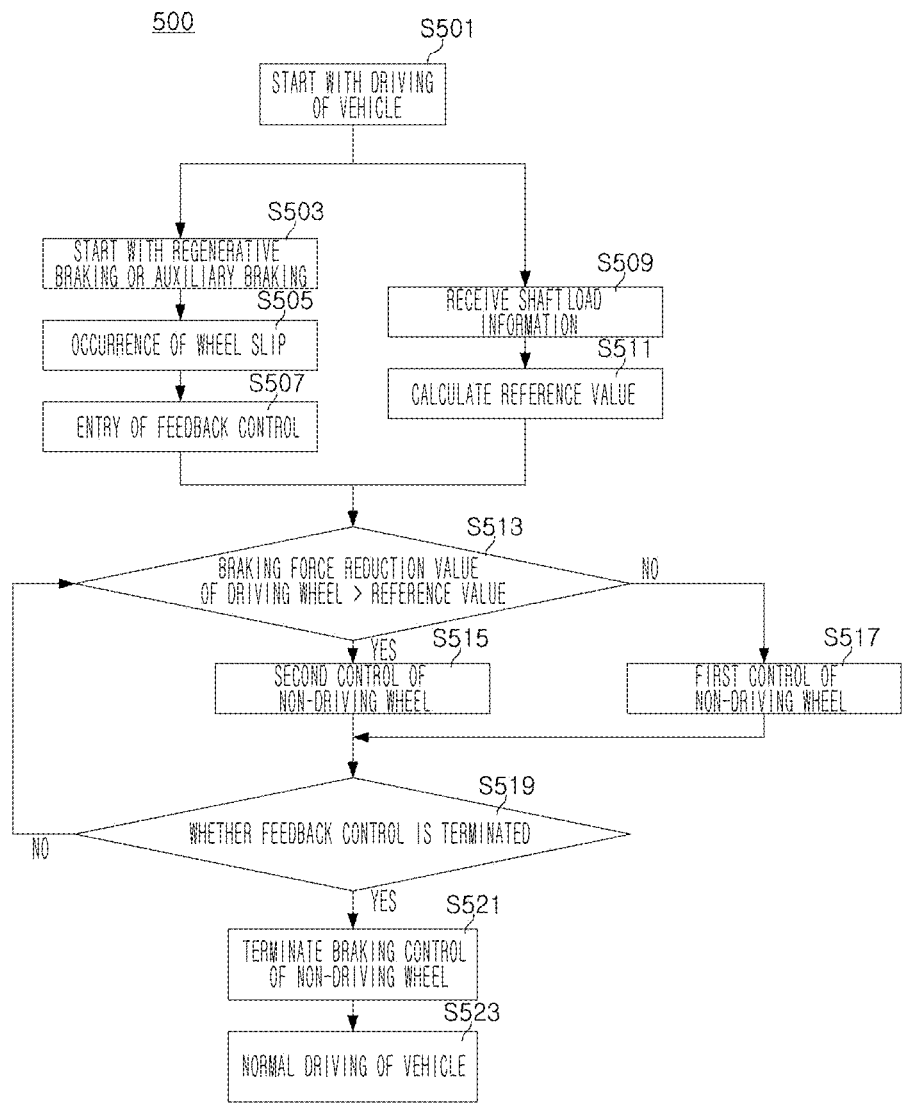
FIG. 2 is a flowchart illustrating a method for braking a vehicle, according to an exemplary embodiment of the present disclosure.

FIG. 2 is a flowchart illustrating a method S500 for braking a vehicle during regenerative braking or auxiliary braking, according to an exemplary embodiment of the present disclosure. A method for braking a vehicle according to an exemplary embodiment of the present disclosure will be described with reference to FIG. 1 and FIG. 2 together.

After driving of a vehicle may be started (S501), the vehicle may be driven in regenerative braking or auxiliary braking mode in a specific situation. For example, when a regenerative braking or auxiliary braking operation unit 170 for regenerative braking or auxiliary braking, such as a brake lever for regenerative braking or auxiliary braking, a brake pedal, or the like is operated, the vehicle may be driven in the regenerative braking or auxiliary braking mode (S503). When the vehicle driving in regenerative braking or auxiliary braking mode may be driven on a low-friction road, wheel slip exceeding a predetermined slip value may occur (S505). In the instant case, to control wheel slip of a driving wheel, braking force applied to the driving wheel may be adjusted using feedback control (S507). In controlling the wheel slip of the driving wheel using the feedback control, although the wheel slip exceeding the predetermined slip value generated from the driving wheel may be reduced, there may be a problem in that a magnitude of braking force generated from the driving wheel is also reduced. For example, the vehicle may be inevitably decelerated at a rate of deceleration, lower than a target deceleration rate due to limitations of a tire friction coefficient and a road surface friction coefficient. According to an exemplary embodiment of the present disclosure, braking force of the driving wheel to be inevitably reduced may be supplemented utilizing a non-driving wheel of the vehicle, to secure target braking force or deceleration without causing wheel slip exceeding the predetermined slip value.

When the reduced braking force of the driving wheel is simply supplemented with braking force of the non-driving wheel, wheel slip exceeding the predetermined slip value may occur in the non-driving wheel, to impair stability of the vehicle. For example, when the braking force of the non-driving wheel increases to a certain level or more, wheel slip exceeding the predetermined slip value may occur in the non-driving wheel. According to an exemplary embodiment of the present disclosure, a braking method of the non-driving wheel according to a predetermined reference value may be changed, to supplement the reduced braking force of the driving wheel using the non-driving wheel without causing wheel slip exceeding the predetermined slip value in the non-driving wheel.

In an exemplary embodiment of the present disclosure, a braking force reduction value of the driving wheel according to feedback control and a reference value may be compared through a braking condition determination unit 110, and the braking method of the non-driving wheel may be selected according to a result thereof (S513). When the braking force reduction value of the driving wheel according to the feedback control is equal to or greater than the reference value, the non-driving wheel may be braked through second control (follow-up control) (S515). Furthermore, when the braking force reduction value of the driving wheel according to the feedback control is lower than the reference value, the non-driving wheel may be braked through first control (additional control) (S517).

In the instant case, the first control may be a method of controlling to generate as much as a difference between required braking force and braking force of the driving wheel as braking force of the non-driving wheel. Therefore, when braking the non-driving wheel by the first control, the vehicle may secure target required braking force and target deceleration. Also, the second control may be a follow-up control method in which braking force corresponding to braking force generated from the driving wheel may be generated as braking force of the non-driving wheel. When braking the non-driving wheel by the second control, the vehicle may be braked to have a value closest to the target braking force and the target deceleration without causing wheel slip exceeding the predetermined slip value.

When the feedback control is terminated, because the required braking force may be satisfied with the driving wheel, there may be no need to additionally control the non-driving wheel. Therefore, the braking condition determination unit 110 may check whether the feedback control is terminated, and S513 to S517 may be repeatedly performed until the feedback control is terminated (S519). As will be described later, when the reference value is determined based on shaft weight information, the vehicle may repeatedly perform S509 to S517 until it is confirmed that the feedback control is terminated. When it is confirmed whether the feedback control is terminated (S521), the braking condition determination unit 110 may terminate the braking control of the non-driving wheel, and the vehicle may enter the normal driving mode again (S523).

In a vehicle in which a shaft weight of the vehicle is different, or on which a tag/pusher axle is mounted, the reference value may be changed. This is because braking force causing wheel slip exceeding the predetermined slip value may be also different, when the shaft weight is different for each shaft of the vehicle. Therefore, the reference value provided as a criterion for selecting the braking method of the non-driving wheel may depend on a shaft weight ratio. As described above, the reference value may be determined from the shaft weight ratio of the non-driving wheel to a total shaft weight of the vehicle, and may be obtained through Equation 4. To determine the reference value, the braking condition determination unit 110 may receive the shaft weight information of the vehicle from a brake controller 130 (S509). The shaft weight information may be transmitted from the brake controller 130 to the braking condition determination unit 110 through a communication network of the vehicle, and the transmission may be performed in real time or periodically. The braking condition determination unit 110 may determine the reference value based on the shaft weight information (S511). S513 to S519 may be repeatedly performed based on the determined reference value.

An example to which a method of controlling braking of a non-driving wheel in various cases is applied will be described.

A vehicle to which an apparatus and/or a method for braking according to an exemplary embodiment of the present disclosure is applied may include one driving wheel shaft and one non-driving wheel shaft. First, a method for braking during regenerative braking or auxiliary braking will be described taking a case in which a shaft weight ratio of a driving wheel and a non-driving wheel is 1:1 as an example (Example 1). In Example 1, a method for braking and a method of determining braking force of the non-driving wheel will be described assuming conditions illustrated in Table 1.

Referring to Table 1, when a friction coefficient of a road surface decreases, wheel slip exceeding a predetermined slip value may occur. As in Nos. 3 to 6 of Table 1, when wheel slip exceeding the predetermined slip value occurs in a driving wheel, because braking force of the driving wheel may be reduced through feedback control to be equal to or lower than the predetermined slip value, the braking force of the driving wheel may not satisfy required braking force. In the instant case, a non-driving wheel may be controlled to supplement the reduced braking force of the drive wheel. When a magnitude of the braking force supplemented to the non-driving wheel is large, wheel slip exceeding the predetermined slip value may occur in the non-driving wheel. Therefore, a braking method of the non-driving wheel needs to be applied differently according to a reduced magnitude of the braking force of the driving wheel. For example, a braking control method of the non-driving wheel may be selected according to a magnitude of the braking force reduction value of the driving wheel, based on a predetermined reference value as a boundary, to prevent occurrence of wheel slip exceeding the predetermined slip value in the non-driving wheel.

In Example 1, because a weight ratio of a driving wheel shaft and a non-driving wheel shaft is 1:1, a reference value may be 50% as a ratio of a shaft weight of the non-driving wheel relative to a total shaft weight. A braking condition determination unit 110 may determine braking force reduction value for each situation, based on the reference value as a boundary, 50%, and may select a braking method of the non-driving wheel according to the result, to perform braking.

Referring to Table 1, when wheel slip exceeding the predetermined slip value occurs, braking force to be equal to or lower than the predetermined slip value may have a difference according to each road surface condition, and a braking force reduction value of the driving wheel according to the braking force of the driving wheel which may be decreased according to each road surface condition may be determined.

In Example 1, when the determined braking force reduction value of the driving wheel is lower than 50%, first control on the non-driving wheel may be performed. Furthermore, when the determined braking force reduction value of the driving wheel is equal to or greater than 50%, second control on the non-driving wheel may be performed.

When the braking force reduction value of the driving wheel is lower than the reference value, for example, Nos. 3 and 4, the first control (additional control) may be per-

TABLE 1

| No | Friction Coefficient of Road Surface | (1) Required Braking Force (N) | (2) Driving Wheel Braking Force (N) | (3) Braking Force Reduction Value(%) (1) − (2)/(1) | (4) Non-Driving Wheel Braking Force (N) | (5) Total Braking Force (N) ((2) + (4)) |
|---|---|---|---|---|---|---|
| 1 | 0.9 | 2000 | 2000 | 0 | — | 2000 |
| 2 | 0.8 | 2000 | 2000 | 0 | — | 2000 |
| 3 | 0.3 | 2000 | 1500 | 25 | 500 | 2000 |
| 4 | 0.25 | 2000 | 1250 | 37.5 | 750 | 2000 |
| 5 | 0.1 | 2000 | 500 | 75 | 500 | 1000 |
| 6 | 0.08 | 2000 | 400 | 80 | 400 | 800 | formed. Furthermore, when the braking force reduction value of the driving wheel is equal to or greater than the reference value, for example, Nos. 5 and 6, the second control (follow-up control) may be performed. In the instant case, in Nos. 1 and 2, because braking force of the driving wheel satisfies the required braking force, a separate braking of the non-driving wheel may not be required.

In Nos. 3 and 4 performing the first control, braking force of the non-driving wheel may be determined as a value obtained by subtracting braking force of the driving wheel from the required braking force, as illustrated in Equation 2.

Furthermore, in Nos. 5 and 6 performing the second control, braking force of the non-driving wheel may be determined through Equation 3. In the instant case, in Example 1, because a shaft weight of the non-driving wheel is equal to a shaft weight of the driving wheel, a ratio to be multiplied by the braking force of the driving wheel becomes 1. Therefore, the second braking force may be equal to the braking force of the driving wheel.

Next, a method for braking during regenerative braking or auxiliary braking will be described taking a case in which a shaft weight ratio of a driving wheel and a non-driving wheel is 2:1 as an example (Example 2). For example, a vehicle may include one driving wheel shaft and one non-driving wheel shaft, a non-driving wheel may have a shaft weight of 1 Ton, and a driving wheel may have a shaft weight of 2 Tons. In Example 2, a method for braking and a method of determining braking force of the non-driving wheel will be described assuming conditions illustrated in Table 2.

a shaft weight, a reference value may be determined through a total shaft weight of the vehicle and a shaft weight of the non-driving wheel. In the instant case, the reference value may be determined using Equation 4. In Example 2, the reference value will be 33.3% as a ratio of the shaft weight (1 Ton) of the non-driving wheel relative to the total shaft weight (3 Tons). The braking condition determination unit 110 may determine braking force reduction value for each situation, based on the reference value, 33.3%, to select a braking method of the non-driving wheel, and may determine braking force for the non-driving wheel according to the selected braking method.

Referring to Table 2, as described in Example 1, when wheel slip exceeding the predetermined slip value occurs, braking force to be equal to or lower than the predetermined slip value may have a difference according to each road surface condition, and a braking force reduction value of the driving wheel may be determined according to each road surface condition through Equation 1.

In Example 2, because the reference value is 33.3%, when the determined braking force reduction value of the driving wheel is lower than 33.3%, for example, Nos. 2 and 3 in Table 2, first control (additional control) may be performed. Furthermore, when the braking force reduction value of the driving wheel is equal to or greater than the reference value, for example, Nos. 4 and 5 in Table 2, second control may be performed. In No. 1, because braking force of the driving wheel satisfies the required braking force, a separate braking of the non-driving wheel may not be required.

TABLE 2

| No | Friction Coefficient of Road Surface | (1) Required Braking Force (N) | (2) Driving Wheel Braking Force (N) | (3) Braking Force Reduction Value(%) (1) − (2)/(1) | (4) Non-Driving Wheel Braking Force (N) | (5) Total Braking Force (N) ((2) + (4)) |
|---|---|---|---|---|---|---|
| 1 | 0.9 | 2000 | 2000 | 0 | — | 2000 |
| 2 | 0.15 | 2000 | 1500 | 25 | 500 | 2000 |
| 3 | 0.14 | 2000 | 1340 | 33 | 660 | 2000 |
| 4 | 0.12 | 2000 | 1200 | 40 | 600 | 1800 |
| 5 | 0.1 | 2000 | 1000 | 50 | 500 | 1500 |

Referring to Table 2, when a friction coefficient of a road surface decreases, wheel slip exceeding a predetermined slip value may occur. As in Nos. 2 to 5 of Table 2, when wheel slip exceeding the predetermined slip value occurs in a driving wheel, because braking force of the driving wheel may be reduced through feedback control to be equal to or lower than the predetermined slip value, the braking force of the driving wheel may not satisfy required braking force. In the instant case, a non-driving wheel may be controlled to supplement the reduced braking force of the drive wheel. When a magnitude of the braking force supplemented to the non-driving wheel is large, because wheel slip exceeding the predetermined slip value may occur in the non-driving wheel, a braking method of the non-driving wheel may be applied differently according to a reduced magnitude of the braking force of the driving wheel. Therefore, a braking control method of the non-driving wheel may be selected according to a magnitude of a braking force reduction value of the driving wheel, based on a predetermined reference value as a boundary, to prevent occurrence of wheel slip exceeding the predetermined slip value in the non-driving wheel. Because braking force causing wheel slip exceeding the predetermined slip value may be changed depending on In Nos. 2 and 3 performing the first control, braking force of the non-driving wheel may be determined as a value obtained by subtracting braking force of the driving wheel from the required braking force, as illustrated in Equation 2.

Furthermore, in Nos. 4 and 5 performing the second control, braking force of the non-driving wheel may be determined through Equation 3. In Example 2, a ratio to be multiplied by the braking force of the driving wheel becomes 0.5, which may be a ratio of a shaft weight of the driving wheel (2 Tons) relative to a shaft weight of the non-driving wheel (1 Ton), and the second braking force may be equal to 0.5 times the braking force of the driving wheel.

Contrary to Example 2, a method for braking during regenerative braking or auxiliary braking will be described taking a case in which a shaft weight ratio of a driving wheel and a non-driving wheel is 1:2 as an example (Example 3). For example, a vehicle may include one driving wheel shaft and one non-driving wheel shaft, a non-driving wheel may have a shaft weight of 2 Tons, and a driving wheel may have a shaft weight of 1 Ton. In Example 3, a method for braking and a method of determining braking force of the non-driving wheel will be described assuming conditions illustrated in Table 3.

TABLE 3

| No | Friction Coefficient of Road Surface | (1) Required Braking Force (N) | (2) Driving Wheel Braking Force (N) | (3) Braking Force Reduction Value(%) (1) − (2)/(1) | (4) Non-Driving Wheel Braking Force (N) | (5) Total Braking Force (N) ((2) + (4)) |
|---|---|---|---|---|---|---|
| 1 | 0.9 | 2000 | 2000 | 0 | — | 2000 |
| 2 | 0.3 | 2000 | 1500 | 25 | 500 | 2000 |
| 3 | 0.2 | 2000 | 1000 | 50 | 1000 | 2000 |
| 4 | 0.1 | 2000 | 500 | 75 | 1000 | 1500 |

As described above, to apply braking force of the driving wheel under conditions that wheel slip exceeding a predetermined slip value does not occur in the non-driving wheel, a braking method of the non-driving wheel should be divided according to a braking force reduction value of the driving wheel. In the instant case, the braking method of the non-driving wheel may be selected by comparing a predetermined reference value and the braking force reduction value of the driving wheel. Also, because braking force causing wheel slip exceeding the predetermined slip value may be changed depending on a shaft weight, a reference value may be determined through a total shaft weight of the vehicle and a shaft weight of the non-driving wheel. The reference value may be determined through Equation 4, and in Example 3, the reference value may be 66.6% as a ratio of the shaft weight (2 Tons) of the non-driving wheel relative to the total shaft weight (3 Tons).

The braking condition determination unit 110 may determine a braking force reduction value for each situation, based on the reference value, 66.6%, to select a braking method of the non-driving wheel, and may determine braking force for the non-driving wheel according to the selected braking method.

Referring to Table 3, when wheel slip exceeding the predetermined slip value occurs, braking force to be equal to or lower than the predetermined slip value may have a difference according to each road surface condition, and a braking force reduction value of the driving wheel may be determined from a ratio of reduced braking force to required braking force according to each road surface condition through Equation 1.

In Example 3, because the reference value is 33.3%, when the determined braking force reduction value of the driving wheel is lower than 66.6%, for example, Nos. 2 and 3 in Table 3, first control (additional control) may be performed. Furthermore, when the braking force reduction value of the driving wheel is equal to or greater than the reference value, for example, No. 4 in Table 2, second control may be performed. In No. 1, because braking force of the driving wheel satisfies the required braking force, a separate braking of the non-driving wheel may not be required.

In Nos. 2 and 3 performing the first control, braking force of the non-driving wheel may be determined as a value obtained by subtracting braking force of the driving wheel from the required braking force, as illustrated in Equation 2. Furthermore, in No. 4 performing the second control, braking force of the non-driving wheel may be determined through Equation 3. In the instant case, in Example 3, a ratio to be multiplied by the braking force of the driving wheel becomes 2, which may be a ratio of a shaft weight of the non-driving wheel (2 Tons) relative to a shaft weight of the driving wheel (1 Ton), and the second braking force may be equal to 2 times the braking force of the driving wheel.

Referring to Examples 2 and 3 again, even when the total weights (3 Tons) of the vehicles are equal to each other, and the braking force reduction value of the driving wheels (1000 N) are equal to each other, as in No. 5 of Table 2 and No. 3 of Table 3, a difference in control method may occur according to a difference in shaft weights of the non-driving wheel and the driving wheels. As described in Examples 2 and 3, in No. 5 of Table 2, the non-driving wheel may be braked through the second control, and in No. 3 of Table 3, the non-driving wheel may be braked through the first control.

Figure 3:
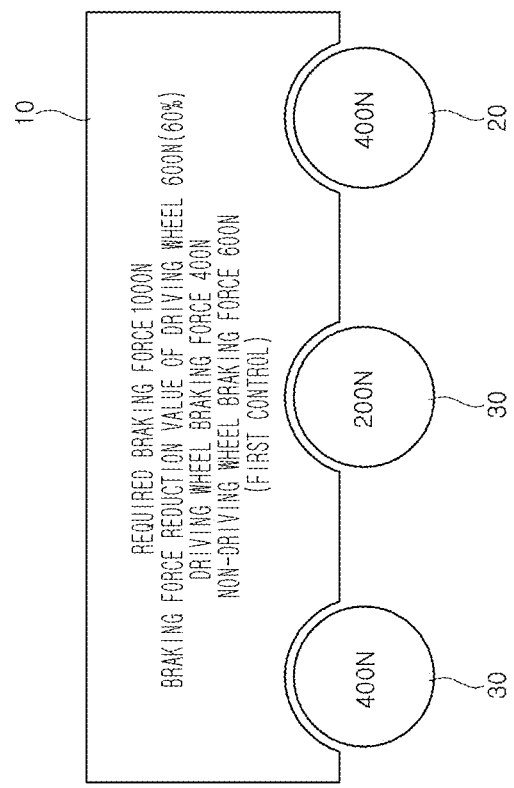
FIG. 3 is a conceptual diagram illustrating first control in Example 4 according to an exemplary embodiment of the present disclosure.
Figure 4:
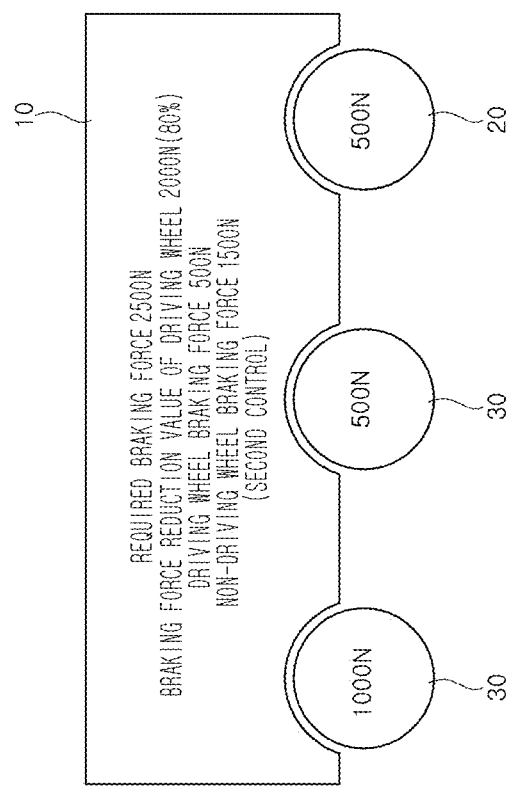
FIG. 4 is a conceptual diagram illustrating second control in Example 4 according to an exemplary embodiment of the present disclosure.

FIG. 3 is a conceptual diagram illustrating first control in Example 4 according to an exemplary embodiment of the present disclosure, and FIG. 4 is a conceptual diagram illustrating second control in Example 4 according to an exemplary embodiment of the present disclosure.

A vehicle 10 may include one driving wheel (20) shaft and two non-driving wheel (30) shafts. For example, the vehicle 10 may have three shafts. In the instant case, if the shafts are referred to as a first shaft, a second shaft, and a third shaft, respectively, the first shaft and the second shaft may be shafts of non-driving wheels 30, and the third shaft may be a shaft of a driving wheel 20.

First, a braking method during regenerative braking or auxiliary braking will be described by taking a case in which, in the vehicle 10, a shaft weight of the first shaft is 2 Tons, a shaft weight of the second shaft is 1 Ton, and a shaft weight of the third shaft is 1 Ton (Example 4).

In Example 4 having a plurality of non-driving wheels 30, to prevent occurrence of wheel slip exceeding a predetermined slip value in the non-driving wheels 30, it is needed that a magnitude of a reference value, determined through a total shaft weight of the vehicle and the shaft weights of the non-driving wheels, and a magnitude of a braking force reduction value of the driving wheel 20 are compared to select a braking method of non-driving wheels 30, as in Examples 1 to 3. The reference value may be determined through Equation 4, and in Example 4, the reference value may be 75% as a ratio of the shaft weight (3 Tons) of the non-driving wheels 30 relative to the total shaft weight (4 Tons).

The braking condition determination unit 110 may select a braking method of the non-driving wheels 30 based on a reference value of 75%, and may determine braking force of the non-driving wheels 30 according to the selected braking method. In Example 4, when a determined braking force reduction value of the driving wheel 20 is lower than 75%, the first control may be performed, and when a determined braking force reduction value of the driving wheel 20 is equal to or greater than the reference value, the second control may be performed.

Referring to FIG. 3, when required braking force of a vehicle 10 is 1000 N, due to occurrence of wheel slip exceeding a predetermined slip value, braking force of a driving wheel 20 for controlling the same to be equal to or lower than the predetermined slip value may be 400 N. In the instant case, a braking force reduction value of the driving wheel 20 may be determined as 60% through Equation 1. Therefore, because the braking force reduction value (60%) may be lower than a reference value (75%) of the vehicle 10, first control may be performed. In the instant case, braking force of non-driving wheels 30 may be set as a value of 600 N obtained by subtracting the braking force 400 N of the driving wheel from the required braking force 1000 N, as illustrated in Equation 2. Furthermore, because the vehicle 10 may be provided with non-driving wheel (30) shafts of first and second shafts, it is necessary to distribute the braking force 600 N of the non-driving wheels 30 to each of the shafts. In distributing the braking force, to prevent the occurrence of wheel slip exceeding the predetermined slip value, the distributed braking force may be allocated according to a ratio of shaft weights of the non-driving wheel shafts. Therefore, according to a shaft weight ratio of a first shaft (2 Tons) and a second shaft (1 Ton) relative to a total shaft weight (3 Tons) of the non-driving wheels 30, 400 N, ⅔ of the braking force (600 N) of the non-driving wheels 30, may be distributed to the first shaft, and 200 N, ⅓ of the braking force (600 N) of the non-driving wheels 30, may be distributed to the second shaft.

Referring back to FIG. 4 again, when required braking force of a vehicle 10 is 2500 N, due to occurrence of wheel slip exceeding a predetermined slip value, braking force of a driving wheel 20 for controlling the same to be equal to or lower than the predetermined slip value may be 500 N. A braking force reduction value of the driving wheel 20 may be determined from a ratio of reduced braking force to required braking force through Equation 1, and in FIG. 4, the braking force reduction value of the driving wheel 20 may be 80%. In the instant case, because the braking force reduction value (80%) of the driving wheel 20 may be greater than a reference value (75%), the vehicle 10 may control non-driving wheels 30 through second control. When the second control is applied, braking force of the non-driving wheels 30 may be determined through Equation 3. Therefore, the braking force of the non-driving wheels 30 may be determined as a value obtained by multiplying a ratio (3) of the shaft weight (3 Tons) of the non-driving wheels 30 relative to the shaft weight (1 Ton) of the driving wheel 20 by the braking force (500 N) of the driving wheel 20, i.e., as 1500 N.

Furthermore, the vehicle 10 may be provided with a first shaft and a second shaft as non-driving wheel (30) shafts, and it is thus necessary to distribute the braking force (1500 N) of the non-driving wheels 30 to each of the shafts. In distributing the braking force to the non-driving wheels, to prevent occurrence of wheel slip exceeding a predetermined slip value, the distributed braking force may be distributed to each of the shafts according to a weight of each of the shafts through Equation 5. Therefore, according to a shaft weight ratio of a first shaft (2 Tons) and a second shaft (1 Ton) relative to a total shaft weight (3 Tons) of the non-driving wheels 30, 1000 N, ⅔ of the braking force (1500 N) of the non-driving wheels 30, may be distributed to the first shaft, and 500 N, ⅓ of the braking force (1500 N) of the non-driving wheels 30, may be distributed to the second shaft.

A vehicle may include a pusher axle or a tag axle on a non-driving wheel (Example 5).

Depending on whether the pusher axle or the tag axle is used, a shaft weight of the non-driving wheel may be changed. For example, there may be a vehicle in which a pusher axle or a tag axle including a single shaft is mounted in a two-shaft vehicle. In the instant case, when the pusher axle or the tag axle is not used in the vehicle, because the vehicle does not receive a shaft weight of the pusher axle or the tag axle, the vehicle may be considered as a two-shaft vehicle. When the pusher axle or the tag axle is used in the vehicle, because the pusher axle or the tag axle may dispersedly receive a weight of the vehicle, the pusher axle or the tag axle may be added into the original two shafts. Therefore, the vehicle may be considered as a vehicle with a total of three shafts.

For example, when the pusher axle or the tag axle is provided, a difference in number of shafts and a difference in weight in the vehicle may occur depending on whether the pusher axle or the tag axle is used. Even when the pusher axle or the tag axle is provided, a basic braking process may be equally applied. When the pusher axle or the tag axle is not used, the non-driving wheels may be braked by applying a process in any one of Examples 1 to 3 as a two-shaft vehicle. Furthermore, when the pusher axle or the tag axle is used, the same process as in Example 4 may be applied to control braking of the non-driving wheels.

Hereinafter, when the pusher axle or the tag axle is not used (a two-shaft vehicle), a case in which a shaft weight of a non-driving wheel is 3 Tons and a shaft weight of a driving wheel is 3 Tons will be referred to as an exemplary embodiment of the present disclosure, and when the pusher axle or the tag axle is used (a three-shaft vehicle), a case in which a shaft weight of a non-driving wheel is 4 Tons (a first shaft: 2 Tons, and a third shaft: 2 Tons), and a shaft weight of a driving wheel is 2 Tons (a second shaft) will be referred to as an example.

When the pusher axle or the tag axle is not used, because a ratio of the shaft weight (3 Tons) of the driving wheel to the shaft weight (3 Tons) of the non-driving wheel is 1:1, braking of the non-driving wheel may be controlled through the same process as in Example 1.

Furthermore, when the pusher axle or the tag axle is used, the shaft weight of the driving wheel and the shaft weight of the non-driving wheel may be changed to be 2 Tons and 4 Tons, respectively. In the instant case, the non-driving wheels may be braked in the same manner as in Example 4. To prevent occurrence of wheel slip exceeding a predetermined slip value in the non-driving wheels, a braking force reduction value of the driving wheel may be compared based on the reference value (66.6%) determined from a ratio of the shaft weight (4 Tons) of the non-driving wheels to the total shaft weight (6 Tons), to select a control method of the non-driving wheel. Furthermore, the braking force of the non-driving wheels determined through the selected control method may be distributed by dividing a ratio of shaft weights of individual non-driving wheels to the total shaft weight (4 Tons) of the non-driving wheels.

Therefore, in a vehicle including a pusher axle or a tag axle, the number of shafts and a shaft weight of the vehicle may be changed depending on whether the pusher axle or the tag axle is used. After determining whether to use a pusher axle or a tag axle, the non-driving wheels may be braked using the same method as in a vehicle in which the pusher axle or the tag axle is not mounted.

Methods according to an exemplary embodiment of the present disclosure may be implemented as forms of program instructions which may be executed by various computer means, and may be recorded in a computer-readable medium. The computer-readable medium may include program instructions, data files, data structures, or the like alone or in combination. The program instructions to be recorded on the computer-readable medium may be specially designed and configured for the present disclosure, or may be known and available to those skilled in the art of computer software.

Examples of the computer-readable medium may include hardware devices specially configured to store and carry out program instructions, such as a read-only memory (ROM), a random access memory (RAM), a flash memory, and the like. Examples of the program instructions may include not only machine language codes such as those generated by a compiler, but also high-level language codes which may be executed by a computer using an interpreter or the like. The hardware device described above may be configured to operate by at least one software module to perform operations of the present disclosure, and vice versa.

According to an exemplary embodiment of the present disclosure, when wheel slip exceeding a predetermined slip value occurs, braking force of a driving wheel, which is inevitably reduced during a process of performing regenerative braking or auxiliary braking, to keep the predetermined slip value or less, may be added using braking power of a non-driving wheel of the vehicle, to improve overall braking performance of a vehicle.

According to an exemplary embodiment of the present disclosure, when wheel slip exceeding a predetermined slip value occurs, it is possible to secure braking force including a target level or braking force closest to the target level while keeping the predetermined slip value or less.

According to an exemplary embodiment of the present disclosure, in not only a vehicle including a plurality of non-driving wheel shafts, but also in a vehicle including a pusher axle or a tag axle, or in other vehicles, when wheel slip exceeding a predetermined slip value occurs during a process of performing regenerative braking or auxiliary braking, it is possible to perform stable braking while keeping the predetermined slip value or less.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for braking a vehicle, the method comprising:
   braking, by a controller, a driving wheel of the vehicle by performing regenerative braking or auxiliary braking;
   comparing, by the controller, a required braking force with braking force of the driving wheel; and
   additionally braking, by the controller, a non-driving wheel of the vehicle, when the controller concludes that the braking force of the driving wheel is lower than the required braking force,
   wherein the controller is configured to perform a first control of braking the non-driving wheel with a first braking force determined from a difference value between the required braking force and the braking force of the driving wheel, when the controller concludes that a braking force reduction value of the driving wheel is lower than a reference value, and
   wherein the controller is configured to perform a second control of braking the non-driving wheel with a second braking force in proportion to the braking force of the driving wheels in a predetermined ratio, when the controller concludes that the braking force reduction value of the driving wheel is equal to or greater than the reference value.

2. The method of claim 1, wherein, in the braking a driving wheel, when the controller concludes that wheel slip exceeding a predetermined slip value occurs in the driving wheel, the controller is configured to reduce the braking force of the driving wheel to be equal to or lower than the predetermined slip value.

3. The method of claim 1, wherein, in the braking a non-driving wheel of the vehicle, the controller is configured to compare the braking force reduction value of the driving wheel with the reference value, and configured to perform the first control of braking the non-driving wheel in proportion to the braking force reduction value of the driving wheel, or to perform the second control of braking the non-driving wheel, depending on the braking force of the driving wheel.

4. The method of claim 3, wherein the braking force reduction value of the driving wheel is a value determined from a ratio of a difference between the required braking force and the braking force of the driving wheel to the required braking force.

5. The method of claim 3,
wherein the reference value is determined from a ratio of a total shaft weight of the non-driving wheel to a total shaft weight of the vehicle, and
wherein the total shaft weight of the vehicle is a sum of a total shaft weight of the driving wheel and the total shaft weight of the non-driving wheel.

6. The method of claim 3, wherein the predetermined ratio is a value determined from a ratio of a shaft weight of the non-driving wheel to a shaft weight of the driving wheel.

7. The method of claim 2, wherein, in the braking a driving wheel, the regenerative braking or the auxiliary braking is performed using feedback control.

8. The method of claim 3,
wherein, in the braking a non-driving wheel of the vehicle, the non-driving wheel is braked in response to a plurality of non-driving wheel shafts, and
wherein the controller is configured to distribute braking force for each of plurality of non-driving wheel shafts according to a ratio of a shaft weight of a corresponding non-driving wheel to a total shaft weight of the non-driving wheel.

9. A non-transitory computer readable storage medium on which a program for performing the method of claim 1 is recorded.

10. An apparatus of braking a vehicle, the apparatus comprising:
a brake configured for braking a non-driving wheel of the vehicle;
a controller configured for controlling braking force of the brake; and a configured to determine braking force of a driving wheel of the vehicle for reducing wheel slip, when the wheel slip exceeding a predetermined slip value occurs in the driving wheel in performing regenerative braking or auxiliary braking, and to compare a required braking force with the braking force of the driving wheel, to determine whether to brake the non-driving wheel,
wherein, when the controller concludes that the braking force of the driving wheel is lower than the required braking force, the controller is configured to determine that braking of the non-driving wheel is necessary, and
the controller is configured to brake the driving wheel, or to brake additionally the non-driving wheel according to a determination result of the controller,
wherein the controller is configured to perform:
a first control of braking the non-driving wheel with a first braking force determined from a difference value between the required braking force and the braking force of the driving wheel, when the controller concludes that a braking force reduction value of the driving wheel is lower than a reference value, and
a second control of braking the non-driving wheel with a second braking force in proportion to the braking force of the driving wheels in a predetermined ratio, when the controller concludes that the braking force reduction value of the driving wheel is equal to or greater than the reference value.

11. The apparatus of claim 10, wherein the controller is configured to reduce the braking force of the driving wheel, when the wheel slip exceeding the predetermined slip value occurs in the driving wheel.

12. The apparatus of claim 11, wherein the controller is configured to perform the regenerative braking or the auxiliary braking using feedback control.

13. The apparatus of claim 10, wherein the controller is configured to compare the braking force reduction value of the driving wheel and the reference value, and configured to perform the first control of braking the non-driving wheel in proportion to the braking force reduction value of the driving wheel, or to perform the second control of braking the non-driving wheel, depending on the braking force of the driving wheel.

14. The apparatus of claim 13, wherein the braking force reduction value of the driving wheel is a value determined from a ratio of a difference between the required braking force and the braking force of the driving wheel to the required braking force.

15. The apparatus of claim 13,
wherein the reference value is determined from a ratio of a total shaft weight of the non-driving wheel to a total shaft weight of the vehicle, and
wherein the total shaft weight of the vehicle is a sum of a total shaft weight of the driving wheel and the total shaft weight of the non-driving wheel.

16. The apparatus of claim 13,
wherein the predetermined ratio is a value determined from a ratio of a shaft weight of the non-driving wheel to a shaft weight of the driving wheel.

17. The apparatus of claim 13,
wherein the controller is configured to brake the non-driving wheel in response to a plurality of non-driving wheel shafts, and
wherein the controller is configured to distribute braking force for each of plurality of non-driving wheel shafts according to a ratio of a shaft weight of a corresponding non-driving wheel to a total shaft weight of the non-driving wheel.

* * * * *